United States Patent [19]

Barzel

[11] 4,448,087

[45] May 15, 1984

[54] CONTINUOUSLY VARIABLE TORQUE TRANSMITTER

[76] Inventor: Eyal Barzel, 4707 Delafield Ave., Riverdale, N.Y. 10471

[21] Appl. No.: 241,028

[22] Filed: Mar. 6, 1981

[51] Int. Cl.³ .................. F16H 15/16; F16H 15/08; F16H 15/26
[52] U.S. Cl. .................................... 74/193; 74/193; 74/199; 74/200
[58] Field of Search .............. 74/190, 193, 198, 199, 74/191, 200

[56] References Cited

U.S. PATENT DOCUMENTS

| | | | |
|---|---|---|---|
| 1,847,553 | 3/1932 | De Pew | 74/200 |
| 2,086,491 | 9/1937 | Dodge | 74/200 |
| 2,611,038 | 10/1952 | Graham | 79/193 |
| 2,660,897 | 11/1953 | Neidhart et al. | 74/200 |
| 2,951,384 | 9/1960 | Rouverol | 74/198 |
| 2,961,881 | 12/1960 | Antoci | 74/190 |
| 3,270,576 | 9/1966 | Goldwasser | 74/191 |
| 3,464,281 | 8/1969 | Azuma et al. | 74/200 |
| 3,473,398 | 10/1969 | Angst | 74/200 |
| 3,626,453 | 12/1971 | Riley | 74/193 |
| 3,817,112 | 5/1974 | Ramsay | 74/190 |
| 4,112,781 | 9/1978 | Baugh | 74/198 |
| 4,177,683 | 12/1979 | Moses | 74/198 |
| 4,249,430 | 2/1981 | Burkett | 74/193 |

Primary Examiner—Lawrence J. Staab
Assistant Examiner—Michael D. Bednarek
Attorney, Agent, or Firm—Jacobs & Jacobs

[57] ABSTRACT

A wheel or part-wheel constructed of assembled ovoids around a central axis so that points on its perimeter can move freely in a direction perpendicular to the plane of its rotation. This is useful in devices such as mechanical transmissions. In these transmissions the transmitted torque is continuously variable over a very large range, and the transmission ratio can be varied at the same time as torque is being transmitted.

14 Claims, 26 Drawing Figures

FIG.5B
FIG.5A
FIG.5D
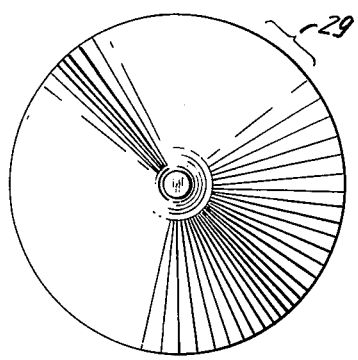
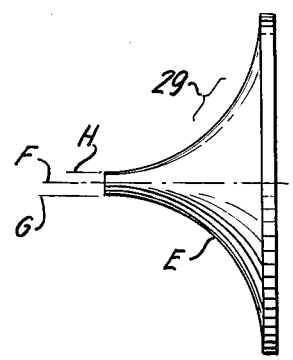
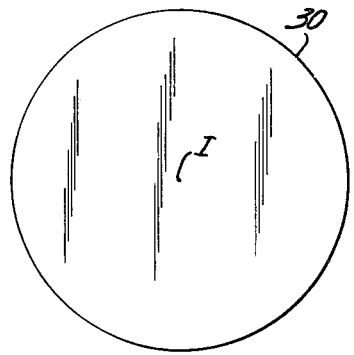
FIG.5C
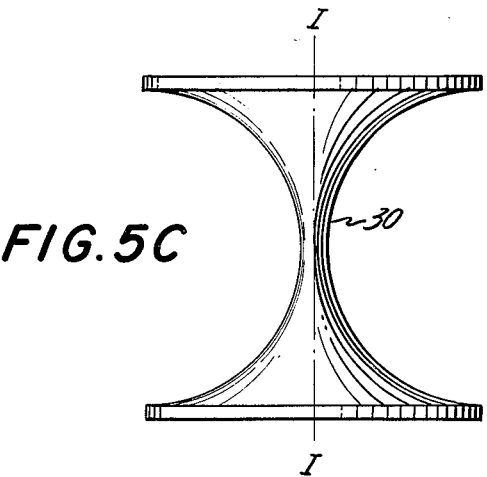
FIG.5E
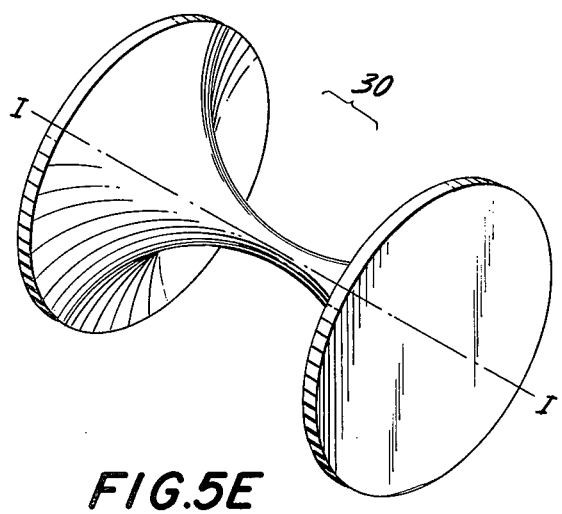
FIG.5F
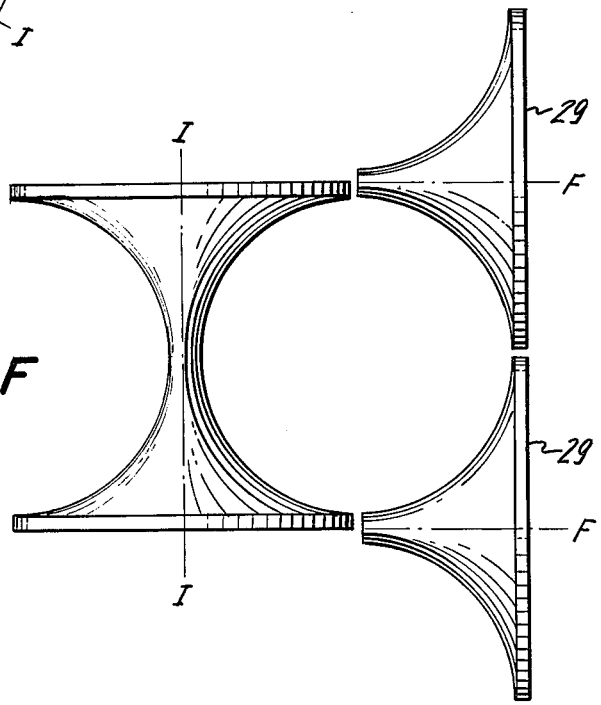

CONTINUOUSLY VARIABLE TORQUE TRANSMITTER

This invention relates to a wheel or part-wheel constructed of assembled ovoids held in position by a suitable framework so that points on its perimeter can move freely in a direction perpendicular to te plane of its rotaton and useful in mechanical transmissions wherein the transmitted torque is continuously variable over a very large range and the transmission ratio can be varied at the same time as torque is being transmitted.

BACKGROUND OF THE INVENTION

The transmission of torque on a standard ten-speed bicycle with derailleur gear-shifting only allows for a limited number of fixed gear ratios. Furthermore, these can be changed only by disengaging the driving and driven members, thus requiring a temporary halt to the transmission of torque. These inadequacies are shared by many other transmission systems, such as those in both manual-shift and automatic-shift vehicles. Other inadequacies of some existing systems include significant frictional losses in the transmission of power. An ideal system would have:
  (1) a continuously variable "gear ratio;"
  (2) a range of "gear ratios" from negative infinity to positive infinity;
  (3) the ability to vary the ratio at any time, whether or not torque is being transmitted; and
  (4) little or minimal frictional loss in the transmission of power.

The systems herein described approach these ideals much more closely than any transmission of which I am aware.

BRIEF DESCRIPTION OF THE DRAWINGS

FIG. 1b is an end view of FIG. 1a;

FIG. 2b is an angularly disposed side view of FIG. 1a;

FIG. 2c is an elevational end view of FIG. 2a;

FIGS. 5a–5d show side and top views of a curved cone and a curved cylinder for use in the second form of the transmission;

FIG. 5e is an elevational views of a curved cylinder for use in the second form of transmission;

GENERAL DESCRIPTION

Figure 1A:
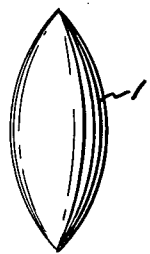
FIG. 1a shows in logitudinal elevation a component ovoid of the invention.
Figure 1C:
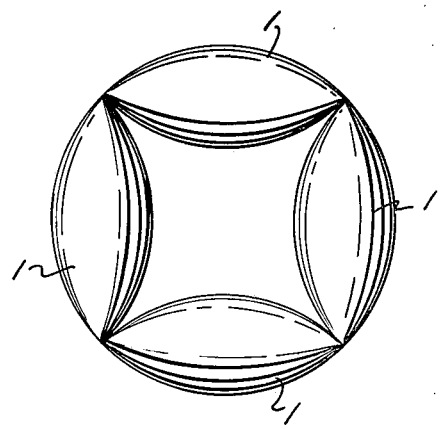
FIG. 1c illustrates in elevation four ovoids of FIG. 1a assembled to form a wheel.
Figure 1B:
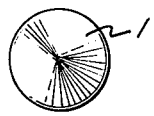
Figure 1D:
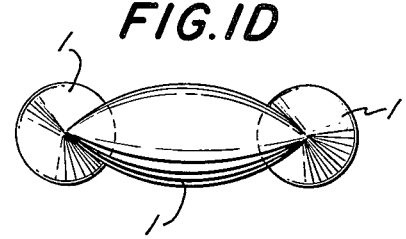
FIG. 1d is a side view of FIG. 1c.

FIGS. 1a and 1b depict the side and end views of an ovoid (football-shaped) object 1 composed of any suitable light material such as aluminum, alloys of aluminum, rubber compounds, plastic, wood and the like. The ovoid 1 can be defined by a 90-degree arc rotated about its endpoints. FIG. 1c shows that four of these ovoids placed end-to-end with a hollow central space form a perfect circle in the plane defined by their endpoints. FIG. 1d shows this construction from the side.

Figure 2A:
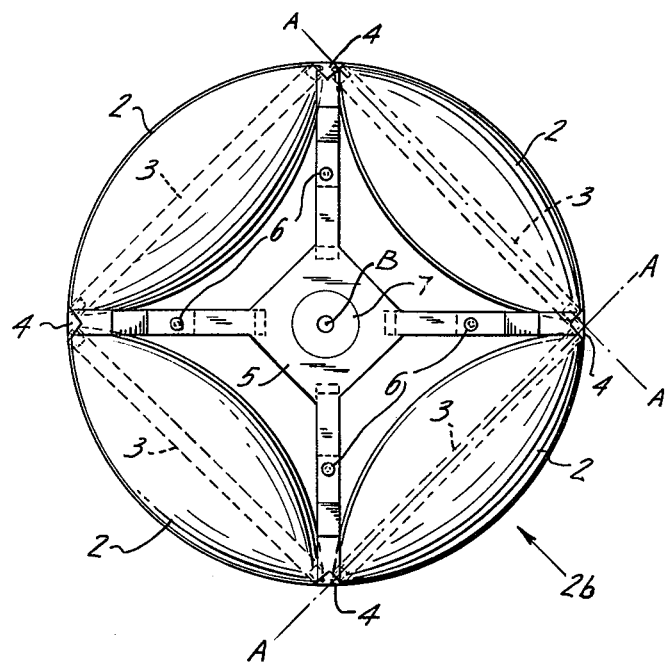
FIG. 2a is a front view similar to FIG. 1a with a frame for holding the ovoid in assembled position.
Figure 2C:
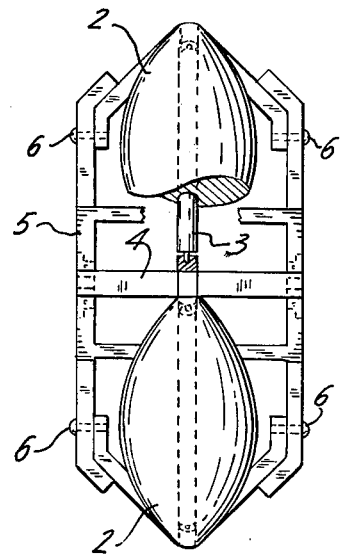
Figure 2B:
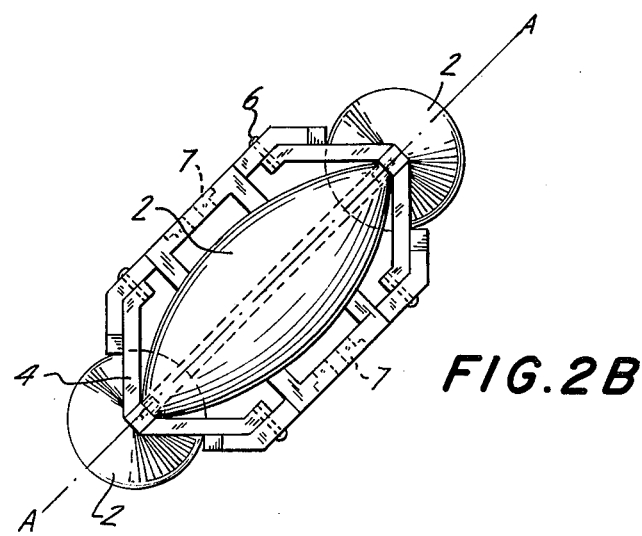

FIGS. 2a, 2b and 2c depict a wheel constructed so that almost any point on its perimeter can move freely in a direction perpendicular to the plane of its rotation. The wheel will be referred to as a "bi-rotor". The bi-rotor is constructed of four ovoids 2, which are identical to the ovoid 1 except that they are hollowed along their axes. This allows space for axles 3, which hold the ovoids to the frame of the wheel while permitting them free rotation about their respective axes (labelled A). The axles are connected to four rounded corner-pieces 4, which together with ovoids 2 form a circle. These corner-pieces 4 are connected to the ends of the eight spokes of the frame 5 by bolts 6. (Note that each spoke in FIG. 2a conceals another one beneath it so that only four are visible.) The center of the frame has a hole through it, into which is fitted bearing 7, allowing the wheel to revolve around its axis B.

For a clear conception of the way in which this bi-rotor can function, consider a bicycle whose wheels are bi-rotors. The bicycle can be pedalled forward in a straight line. If a wind were blowing across the bicycle's path, the bicycle would drift sideways, while still being propelled forward by the rider.

Note that the wheel described in FIG. 2, while being simple in design, does not function perfectly as a bi-rotor, because at the corner-pieces 4 it can not move perpendicularly to the plane of rotation of the wheel around B. In applications where this presents a problem, one can use an alternate design such as that described in FIG. 3.

Figure 3A:
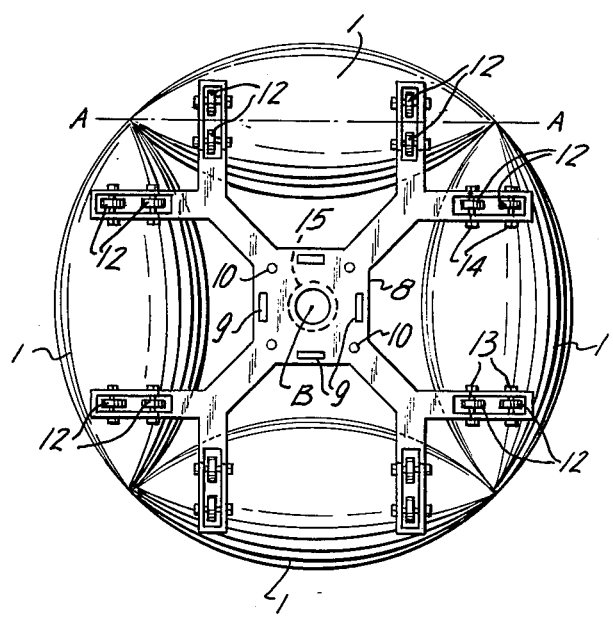
FIG. 3a is a front view similar to FIG. 2a of a modified form of the invention.
Figure 3B:
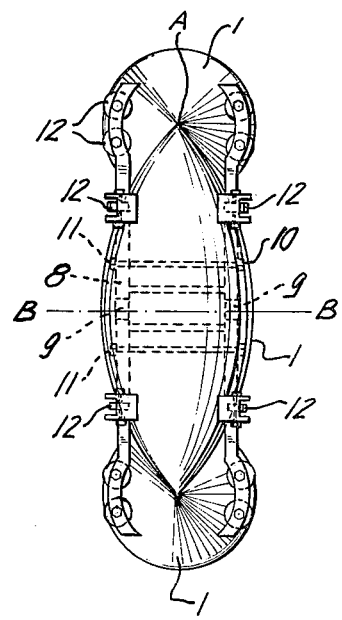
FIG. 3b is a fragmentary side view of FIG. 3a with parts broken away.

Referring to FIG. 3a, the four ovoids 1 are placed end-to-end as described in FIG. 1. The ovoids 1 are held in place by a frame composed of two identical pieces 8, only one of which can be seen in FIG. 3a since the other is hidden beneath it. The two halves 8 of the frame are secured by bars 9, bolts 10, and nuts 11. Each spoke of the frame forms a Y. The arms of the Y are perpendicular to each other as seen from the front, (FIG. 3a), and each forms an arc of a circle as seen from the side (FIG. 3b). Each arm contains two rollers 12, which are secured to the arm by axle-bolts 13 and nuts 14. Each ovoid 1 is held by four arms, whose rollers 12 permit free rotation of the ovoid about its axis A. There is a hole in the center of the frame, which contains a bearing 15, permitting rotation of the wheel around axis B.

The invention can be embodied in the four transsmissions (#1 through #4), all of which use a bi-rotor. Transmissions #1, #2, and #3 are all depicted using the bi-rotor described in FIG. 2, but any bi-rotor, such as the one described in FIG. 3 can of course be used. Transmission #4 is shown using the bi-rotor described in FIG. 3; it can not be used with the one described in FIG. 2.

Figure 4A:
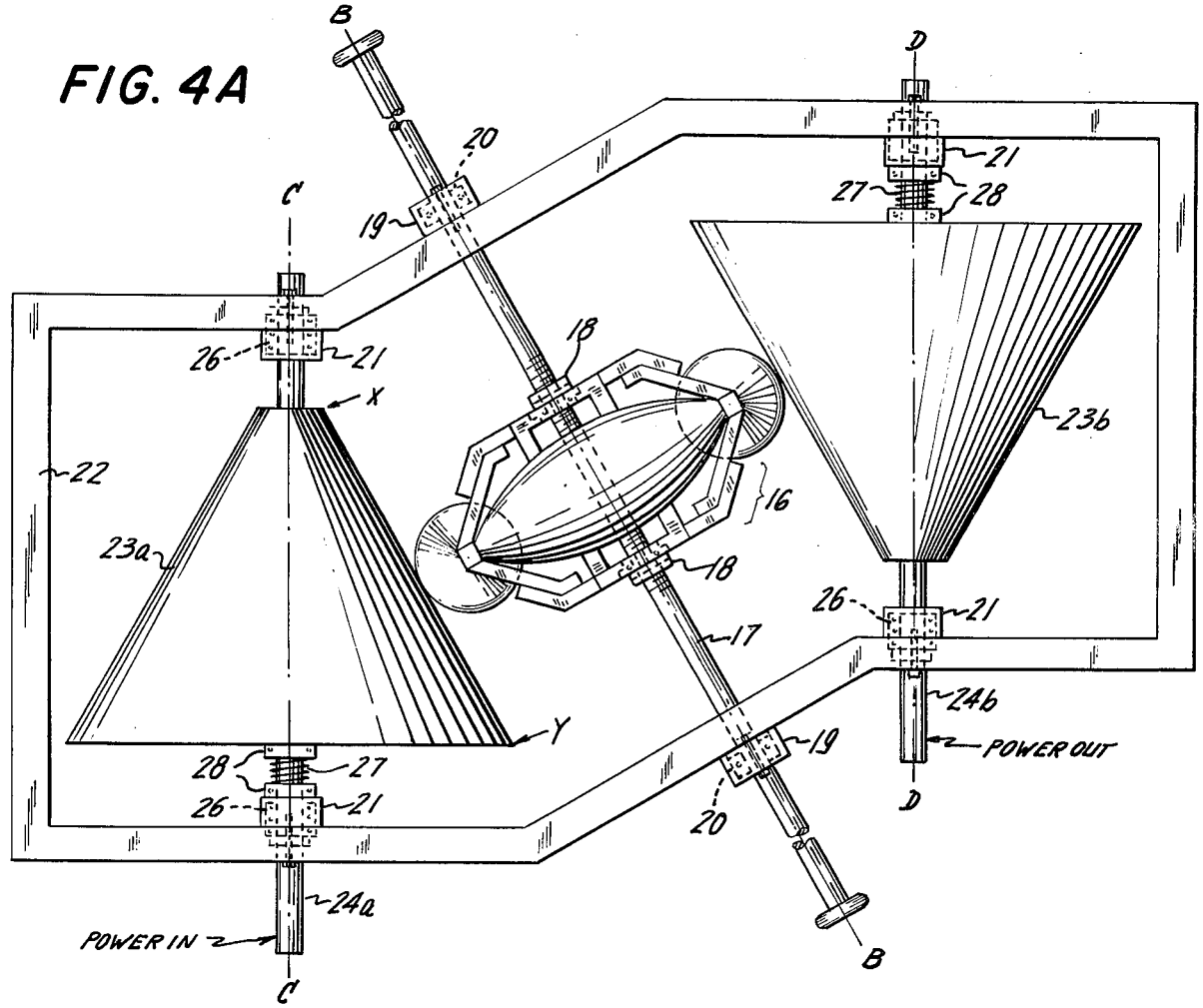
FIG. 4a is a top view of a first form of transmission embodying the invention.
Figure 4B:
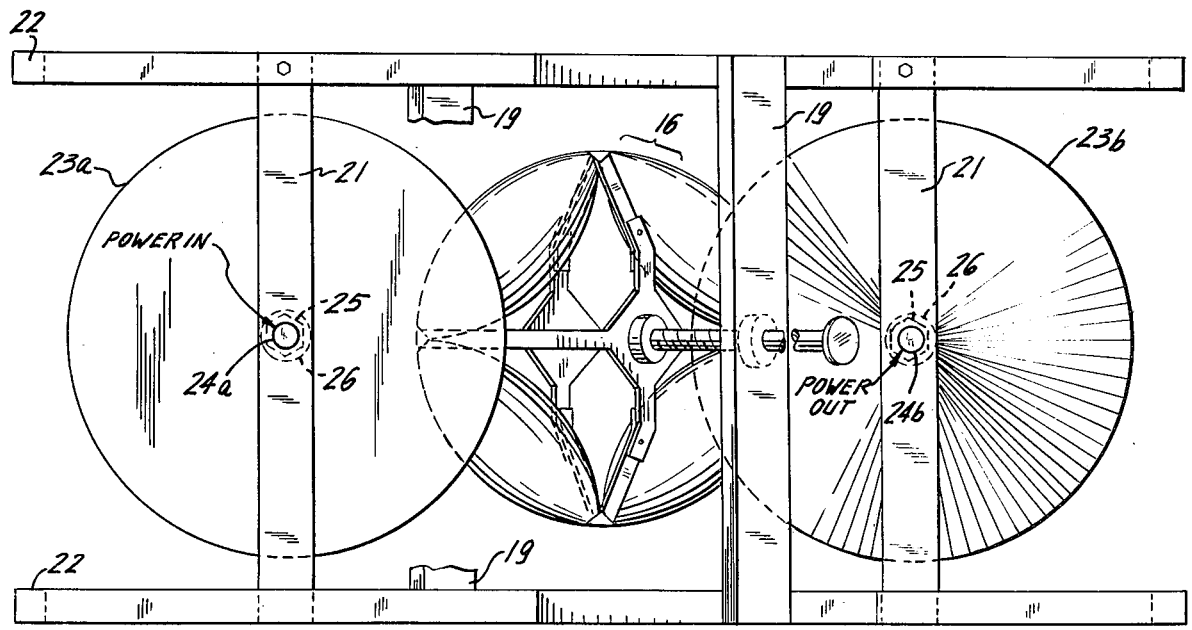
FIG. 4b is a front elevational view of the transmission of FIG. 4a partly cut away.

FIG. 4a shows the top view of transmission #1. Bi-rotor 16 is mounted on shit-axle 17, and is secured in place by two threaded bearings 18, so that bi-rotor 16 can rotate freely around axle 17, while remaining in a fixed position on it. The shift-axle 17 is held onto the frame 22 of the transmission by supports 19, which contain bearings 20, allowing the axle-bi-rotor assembly to be moved along its axis B. There are two cones 23, each fixed to an axle 24. The axles 24 are held in place by supports 21, and nuts 25 (see FIG. 4b). The supports 21 contain bearings 26, allowing the cone-axle assemblies to rotate about their axes C and D. Shown also are springs 27 and bearings 28 which force the cones to be pressed against the bi-rotor while still allowing them to revolve. An alternative method of providing pressure of the cones against the bi-rotor is by the use of threaded bearings on the axles 24, pressing against the cones 23 and the supports 21.

As axle 24a is turned, cone 23a turns about axis C. This causes the bi-rotor to turn about axis B, in turn causing cone 23b and its axle 24b to turn about their axis D. Thus, torque can be transmitted from axle 24a, "Power In," to 24b, "Power Out." The transmission ratio, which determines the relative velocity and torque of the two cones, depends on the position of the bi-rotor. In the assembly shown, each of the cones has a base diameter equal to the diameter of the bi-rotor and a tip diameter which is one tenth of that. If the bi-rotor is positioned at point X on drive cone 23a, for every ten turns of the drive cone, the bi-rotor will turn once. The driven cone 23b will turn once for every turn of the bi-rotor in this position. Consequently, the driven cone will turn once for every ten turns of the drive cone, giving a transmission ratio of 1:10. If the shift-axle 17 is moved so that the bi-rotor is positioned at point Y on the drive cone, the transmission ratio will be 10:1. Thus, in this example the ratio is variable over a range, the extremes of which differ by a factor of 100.

In general, the ratios achievable depend on the dimensions of the cones, and are, in fact, independent of the size of the bi-rotor. The properties of the bi-rotor allow it to be shifted, changing the transmission ratio, while power is being transmitted and without decoupling of the driving and driven members. Note that the transmission ratio is continuously variable between its extremes because the bi-rotor can be positioned anywhere along the cones.

Essential parts for second form of transmission (#2), a cone and a cylinder, are described in FIG. 5. FIG. 5a shows a side view of cone 29 with curved sides which can be described as a 90-degree arc E rotated around axis F, which is parallel to the tangent to the arc G at one of the arc's endpoints H. However, the base of the cone 29 extends into a short roller for structural support. FIG. 5b is the top view of cone 29. FIGS. 5c and 5d are the side and top views of cylinder 30 with concave sides, whose shape is that of two cones 29 placed tip-to-tip, though it is in fact one piece with a central axis I. FIG. 5e demonstrates that roller 30 and two cones 29 can be positioned so that they outline a full circle in the plane defined by their axes F and I.

Figure 6A:
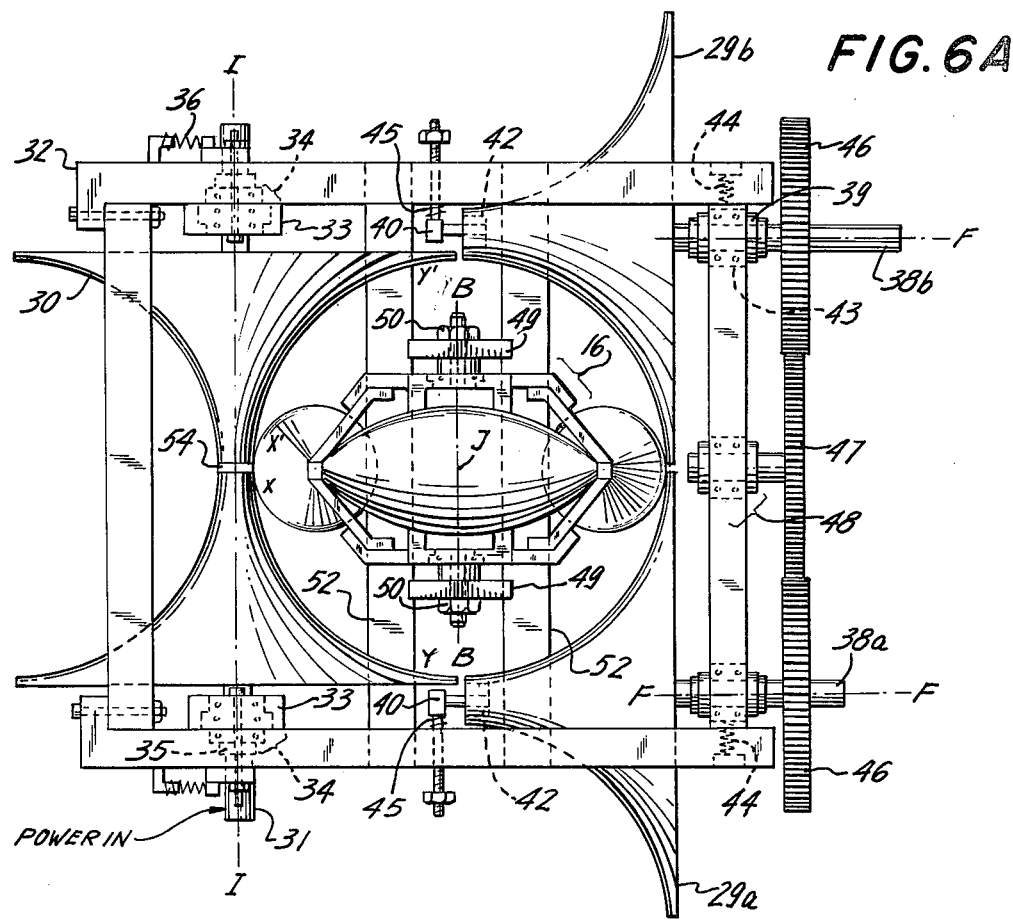
FIGS. 6a, 6b, and 6c are, respectively, top, side, and front views of the second form of transmission.
Figure 6B:
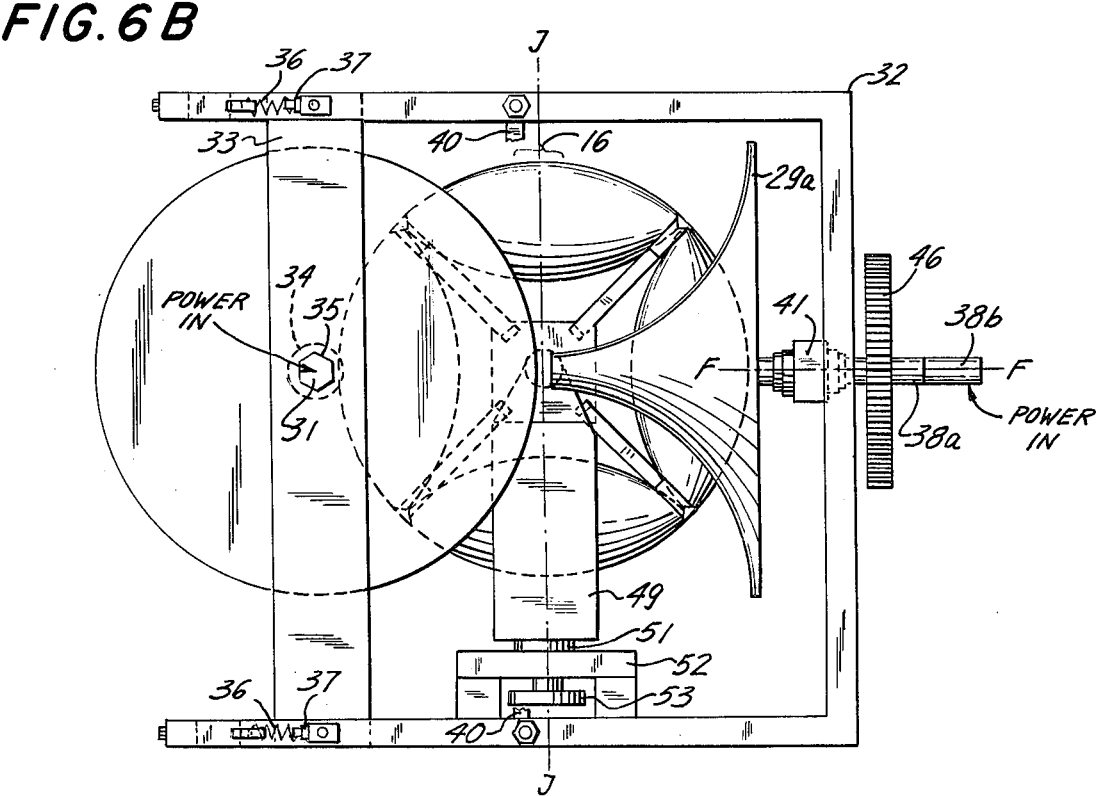
Figure 6C:
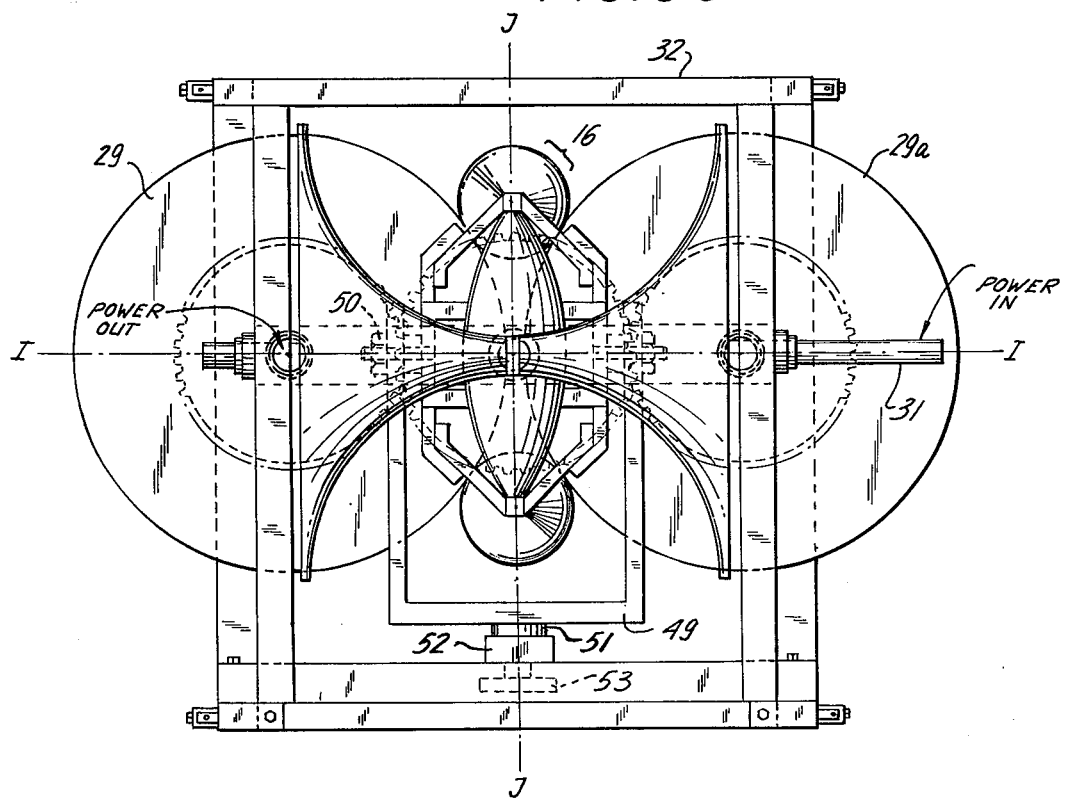

FIGS. 6a, 6b, and 6c are the top, side, and front views of transmission #2. In this embodiment the bi-rotor is positioned differently in the side and front views than in the top view. This transmission has a roller 30 and two cones 29 arranged to form a circle as described in FIG. 5f. The diameter of this circle is the same as that of the bi-rotor 16. Roller 30 is fixed to axle 31, and is mounted by nuts 35 to supports 33, which contain bearings 34, allowing the axle and cylinder to rotate about axis I. Springs 36 push on plate 37, which is connected to supports 33. The supports 33 are mounted to frame 32 so that they can slide, allowing the springs to push the cylinder onto the bi-rotor. Cones 29 are fixed to axles 38, and mounted to the frame 32 by nuts 39, supports 40 and 41, bearings 42 and 43, and springs 44 and 45, so that the cones are pushed towards the bi-rotor, and can rotate about their axes F. Note that threaded bolts and nuts can be used to apply pressure instead of the springs. Gears 46 are attached to axles 38. Gear 47 is mounted on support 41 via bearings and nuts 48, so that it maintains contact with both gears 46. Thus, both cones 29 will always turn together and in the same direction. The bi-rotor 16 is mounted onto housing 49 (seen best in FIG. 6c) by axle, bearing, and nut assembly 50, giving it free rotation about its axis B. The housing 49 is connected to the frame by a swivel mount which consists of bearings 51 and supports 52, allowing it to be rotated about its axis J. The housing can be rotated using small gear 53 to which it is attached.

Transmission #2 works on the same principle as transmission #1, except that it allows shifting into reverse. In this transmission the bi-rotor is rotated into position, as opposed to sliding into position. When the bi-rotor is in contact with cone 29a (see FIG. 6a) and roller 30 is rotated clockwise as viewed from "Power In," then cone 29a and cone 29b will turn counter-clockwise as viewed from "Power Out." If, however, the bi-rotor is in contact with cone 29b, cone 29b will turn clockwise. Thus the transmission can go both forward and reverse. The transmission ratio is determined by the bi-rotor's position on the cylinder. When positioning the bi-rotor at position X (see FIG. 6a), one turn of the roller 30 will move the bi-rotor minimally and consequently cone 29b will also move minimally. At position Y one turn of the cylinder will cause the bi-rotor to turn close to a full circle, and will cause cone 29b to turn many times. Since any point between positions X and Y can be selected, there is, in effect, a continuous choice of transmission ratios between these extremes. The same is true between X' and Y' in which the continuous choice will be for the reverse mode. A slippage bearing 54 can be added to the cylinder for some applications to provide a neutral position. This transmission has a wide range of transmission ratios which are determined by the geometry of the cones; in the example given in FIG. 6 the ratio varies from 10:1 to 1:10 when the bi-rotor is positioned between X and Y, from −1:10 to −10:1 when the bi-rotor is between X' and Y', and is zero when the bi-rotor is positioned on slippage bearing 54.

Figure 7C:
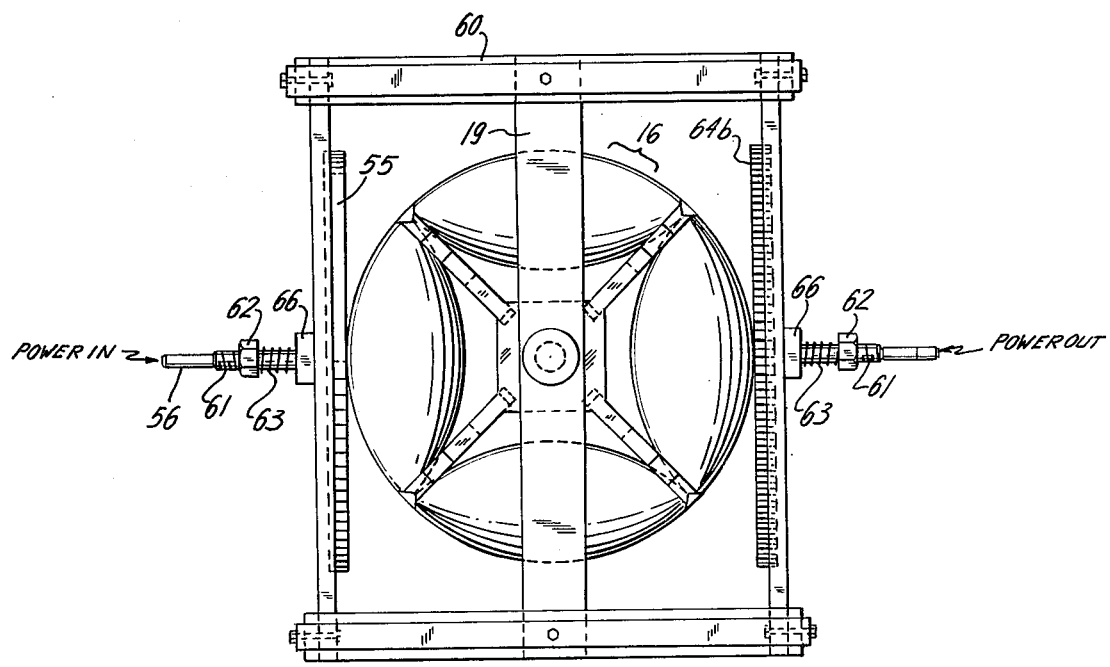
FIGS. 7a, 7b, and 7c are, respectively, top, front, and side views of a further modified form of transmission.
Figure 7A:
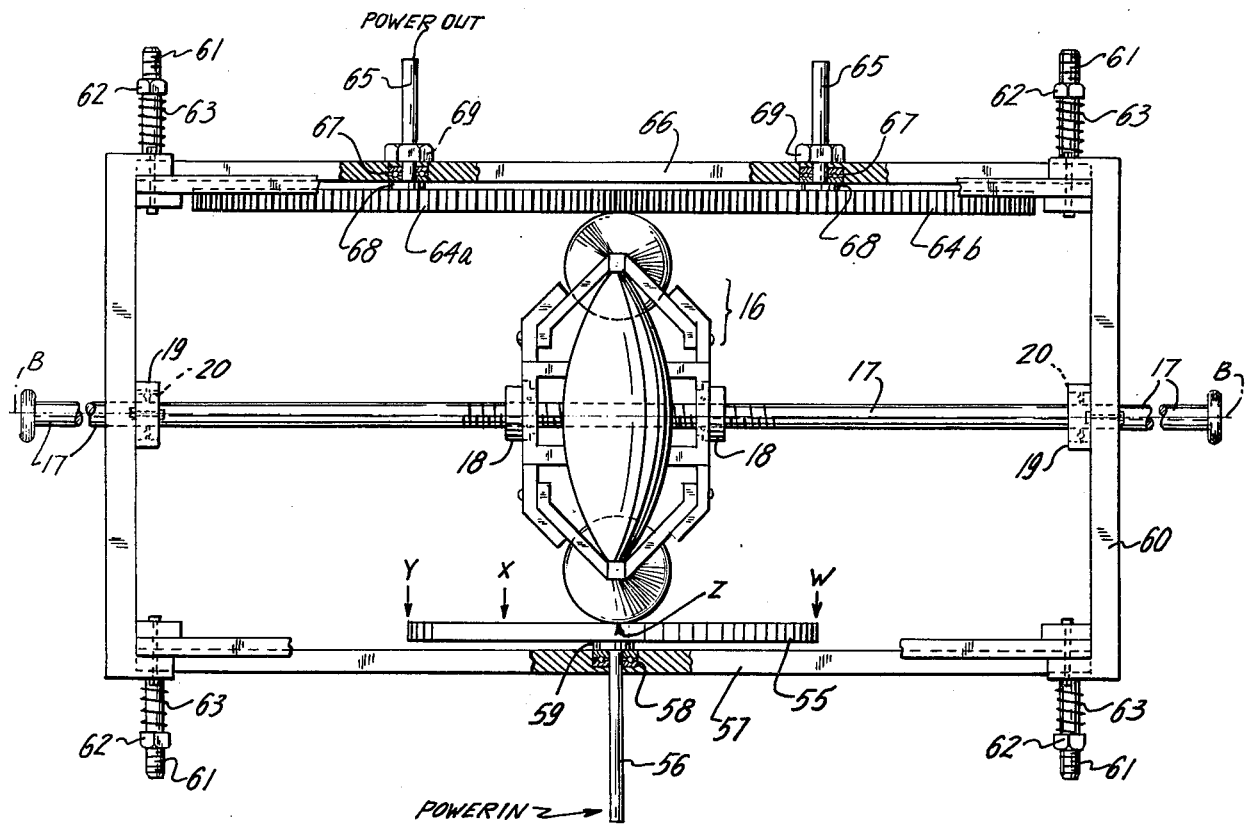
Figure 7B:
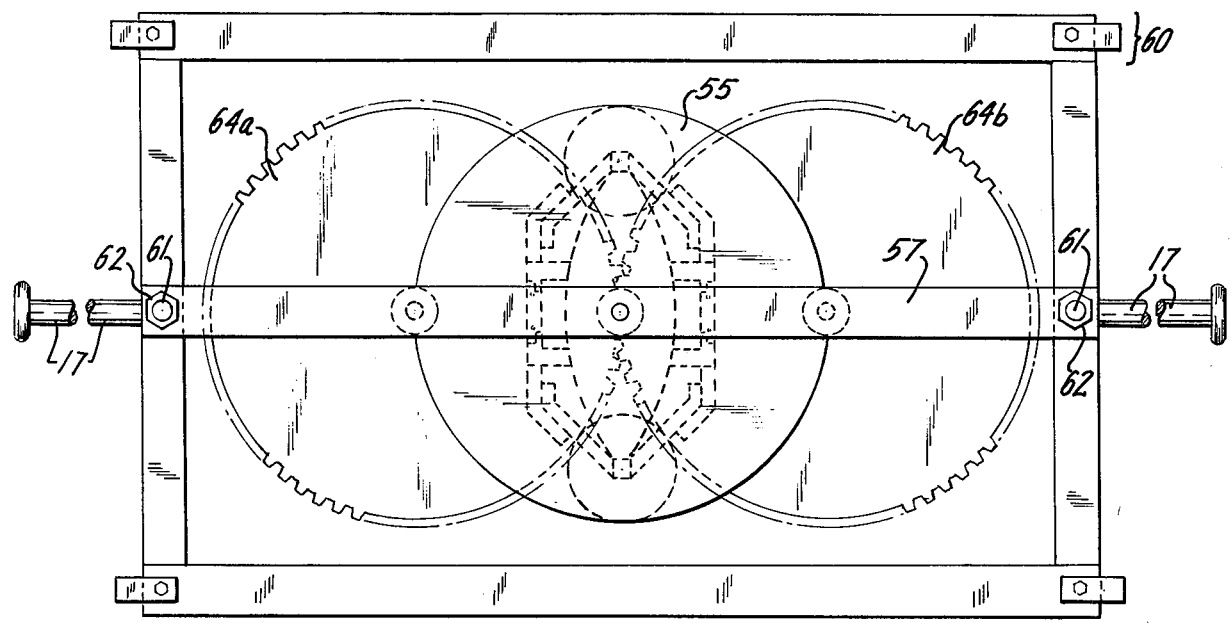

FIG. 7a, 7b and 7c depict top, front, and side views of transmission #3. In this transmission, the bi-rotor transfers power between discs. Disc 55 is fixed to axle 56. Axle 56 is mounted on support 57 by bearings 58 and 59, allowing it to rotate around its axis. Support 57 is connected to frame 60 via long bolts 61. Nuts 62 and springs 63 cause the whole assembly to press the disc against the bi-rotor. Toothed discs 64 are fixed to axles 65. (Although discs 64 have teeth along their entire perimeter, for clarity they are only depicted with a few of their teeth in FIG. 7b.) The Axles 65 are mounted on support 66 through bearings 67 and 68 and secured via nuts 69, so that the toothed discs 64 can rotate around their axes. The discs 64 are interlocking so that when one turns clockwise the other turns counter-clockwise. Support 66 is mounted on frame 60 by the same spring-loaded assembly used for support 57 so that the toothed discs 64 will also press against bi-rotor 16. Nuts may be used instead of springs to adjust the pressure. The bi-rotor 16 is mounted to the frame using a shift axle assembly identical to that used in transmission #1, FIG. 4. Thus, the bi-rotor can rotate freely around its axis B, as well as be shifted along it. Note that axis B forms a plane with the axes implied by axles 65 and 56.

When the bi-rotor is at position X, one turn of the driver-disc 55 causes the driven disc 64a to turn once. As the bi-rotor is moved towards position Y, for every turn of the driver-disc 55 the driven disc 64a rotates more and more times. The transmission ratio has no theoretical upper limit, and is only limited by friction and slippage. At position Z, where the bi-rotor is depicted to rest in FIG. 7a, the transmission ratio is zero. Practical considerations may require the introduction of a slippage bearing at this point on disc 55 to prevent excessive wear of the bi-rotor. As the bi-rotor is moved towards W, every turn of the driver-disc 55 causes the driven disc 64a to turn more and more, but in the opposite direction. Again, there is no upper limit. Thus, a continuously variable transmission ratio from negative infinity to positive infinity may be achieved, independent of the size of the transmission.

Transmission #4 works on a different principle than the first three. It uses the capabilities of the bi-rotor as an integral part of the transmission process, rather than as a means for changing the transmission ratio, and therefore must use a bi-rotor constructed so that all of the points on its perimeter can move in a direction perpendicular to the plane of rotation, and consequently uses a bi-rotor such as shown in FIG. 3 as opposed to that shown in FIG. 2.

Figure 8A:
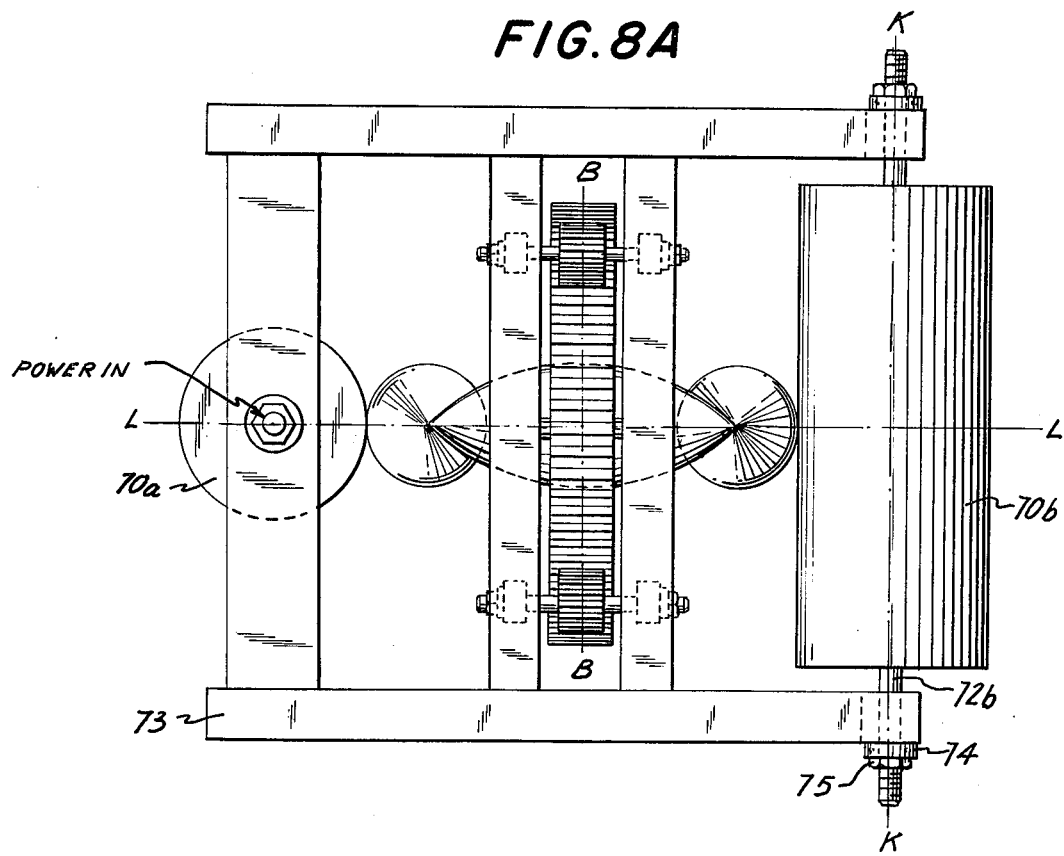
FIGS. 8a, 8b, and 8c are, respectively, top, front, and side views of a still further modified form of transmission.
Figure 8B:
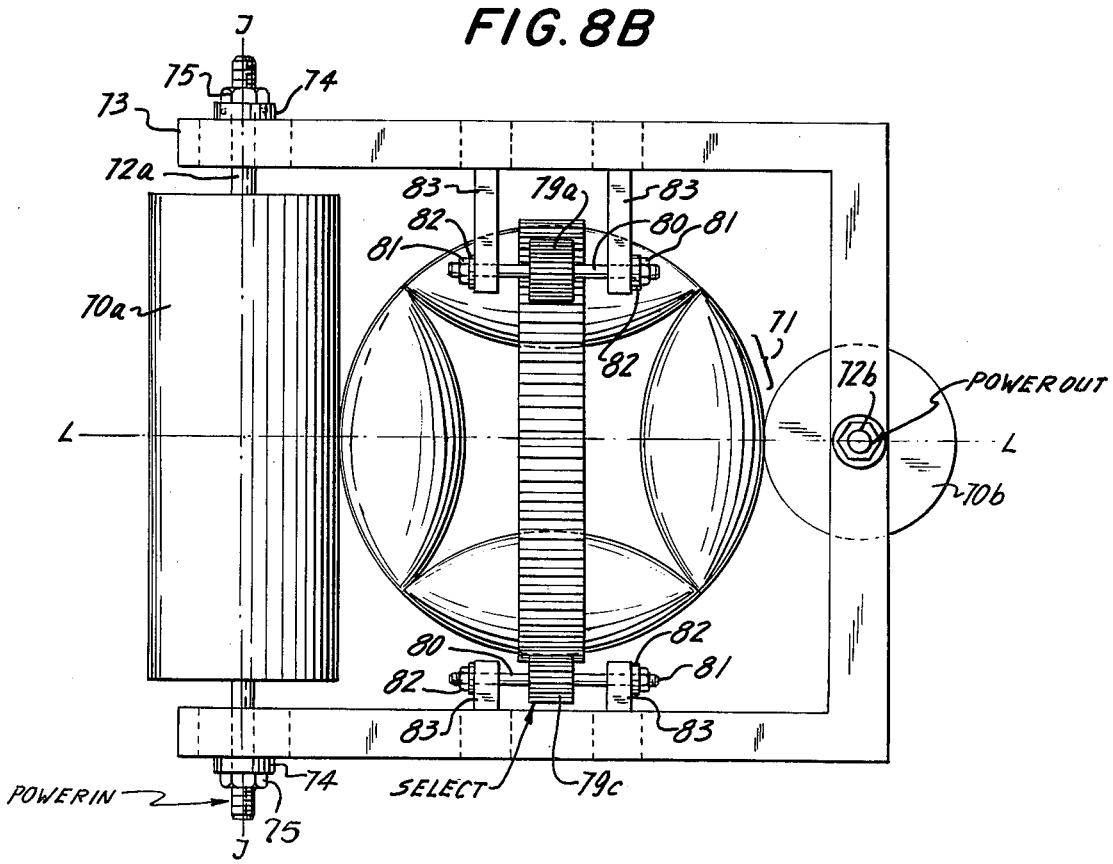
Figure 8C:
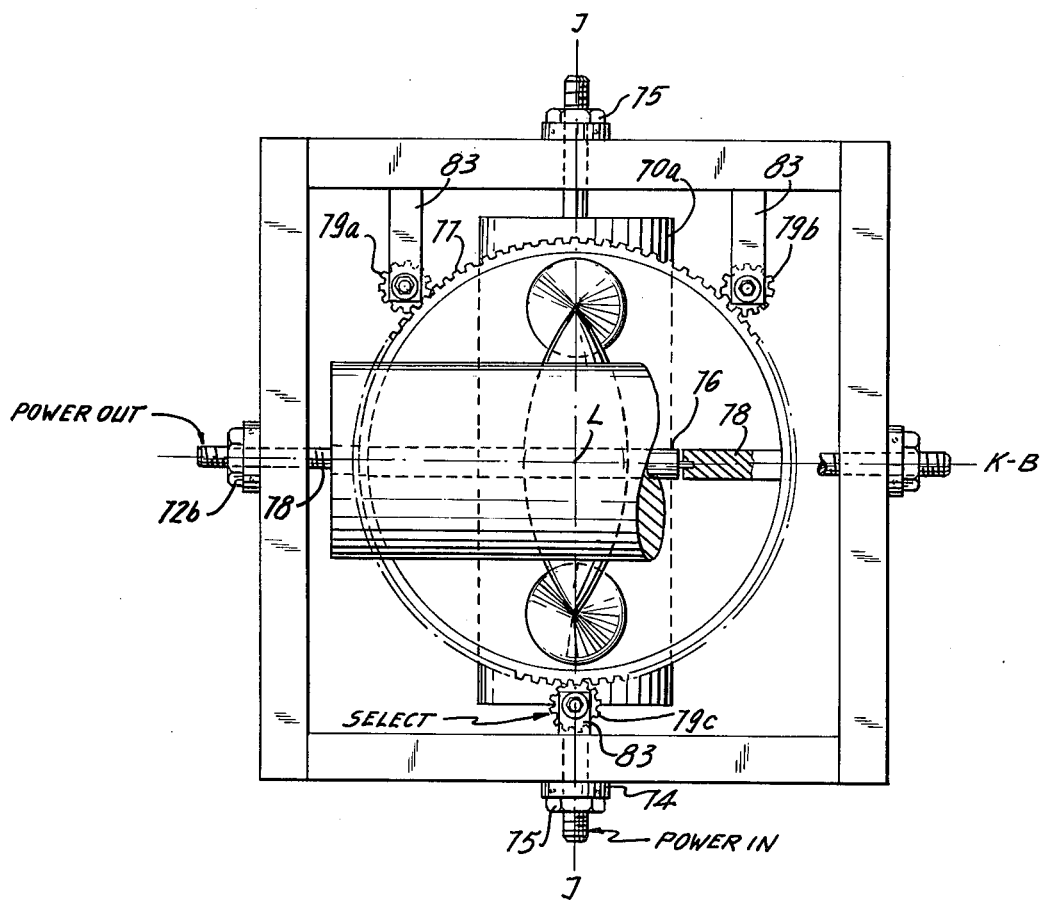

FIGS. 8a, 8b and 8c show top, front, and side views of transmission #4. In this transmission, power is transferred between two cylinders 70 by way of bi-rotor 71. (The bi-rotor is shown in FIG. 8 schematically. For clarity, much of its supporting structure has been left out.) The cylinders 70 are fixed to axles 72. The axles 72 are mounted on frame 73 with bearings and nuts 74 and 75, permitting them rotation about their axes J and K. The cylinders are oriented so that the planes perpendicular to their axes are perpendicular to each other. Note that in this construction the cylinders are attached directly to the frame, but a mechanism to provide pressure of the cylinders on the bi-rotor, such as described in the other transmissions, may be needed. The bi-rotor 71 is mounted on axle 76 (with nuts and bearings) as shown in FIG. 8c, so that it is fixed on the axle, but can turn freely about it. The axle is fixed to ring gear 77 by supports 78. The ring gear is positioned between three small gears 79, each of which is mounted to the frame by axles 80, nuts 81, bearings 82 and supports 83. Each of the gears 79 can rotate about their axes. This allows ring gear 77 to be rotated about its central axis L by turning one of the gears 79. Thus, rotating select-gear 79c changes the orientation of the bi-rotor 71 by rotating its axis B about axis L.

In Transmission #4, transfer of power from cylinder 70a to 70b occurs by way of the bi-rotor which can separate the motion into two constituent vectors. If the bi-rotor's axis B is oriented as shown in FIG. 8b then when cylinder 70a is turned, the ovoids 1 will rotate about their axes A and the bi-rotor will not rotate about axis B at all. However, if the bi-rotor's axis B is oriented at ninty degrees to that of the above, then when cylinder 70a is turned the bi-rotor will rotate about axis B (excluding the braking effect of cylinder 70b) and the ovoids not at all. If the bi-rotor's axis B is oriented anywhere between these two extremes, then when cylinder 70a is rotated the motion at the point of contact between the cylinder and the bi-rotor will be separated into two constituent vectors. The ovoid in contact with the cylinder will rotate about its axis A, and the bi-rotor about its axis B. The extent of rotation of the bi-rotor about axis B will depend on its orientation.

The orientation of the bi-rotor as shown in FIG. 8 will be labelled zero degrees. Deviations from this position can be measured in positive or negative degrees. Note that the transmission ratio between cylinder 70a and the bi-rotor varies between zero at zero degrees to approximately 2:1 at ninety degrees. Conversely, the transmission ratio between cylinder 70b and the bi-rotor varies from 2:1 at zero degrees to zero at ninety degrees. Thus the transmission ratio from cylinder 70a to 70b varies from zero at zero degrees to infinity at ninety degrees. As one moves from zero to negative ninety degrees the ratio approaches negative infinity.

Thus this transmission has a continuously variable transmission ratio, which can be set for forward and reverse, and approaches infinity in either direction.

It will thus be appreciated that the invention is of versatile nature and can be embodied in a variety of transmissions using discs, cones, or cylinders and component ovoids as novel elements which are assembled and held in wheel or wheel-part form. The ovoids are held in position by a suitable frame-work so that points on its perimeter can move freely in a direction perpendicular to the plane of its rotation. The transmissions are characterized by continuously variable torque transmission over a very large positive and negative range of ratios.

I claim:

1. A continuously variable torque transmitter comprising a bi-rotor having a plurality of ovoids assembled to form a wheel whose perimeter is a substantially continuous circle, each ovoid being mounted for independent rotation about its axis and each ovoid defining a predetermined portion of the arc of the circle, the sum of the predetermined portions being substantially equal to said perimeter, and a frame holding the ovoids in assembled relationship.

2. A continuously variable torque transmitter according to claim 1, wherein the frame for holding the ovoids in assembled relationship constitutes a part-perimeter of the wheel, the ovoids constituting the remainder of the perimeter and the ends of the ovoids being in contact with the frame at the perimeter, so that the perimeter of the wheel is a substantially continuous circle.

3. A continuously variable torque transmitter according to claim 1, wherein the ovoids are assembled with their ends in contact so that a substantially continuous circle at the perimeter of the bi-rotor is formed only by the ovoids.

4. A continuously variable torque transmitter according to claim 1, wherein the wheel is constructed of four ovoids assembled with their apices in contact and the central axis being transversely disposed in a space bounded by the assembled ovoids.

5. A continuously variable torque transmitter according to claim 1, wherein the bi-rotor is provided with driving and driven members.

6. A continuously variable torque transmitter according to claim 1, wherein each ovoid is mounted for independent rotation around its axis, the wheel being constructed of four ovoids assembled with their apices in contact and the central axis being transversely disposed in the space bounded by the assembled ovoids.

7. A continuously variable torque transmitter according to claim 5, wherein the driving and driven members are cones mounted for axial rotation.

8. A continuously variable torque transmitter according to claim 5, wherein the driving and driven members are curved rollers mounted for axial rotation.

9. A continuously variable torque transmitter according to claim 5, wherein the driving and driven members are curved rollers mounted for rotation about their axes with their axes in the same plane, the curved sides of the rollers forming a portion of a circle in that plane, the bi-rotor being mounted so that its center point is at the center of the circle and its axis being in the plane of the circle and rotatable in that plane about the center point, the diameter of the bi-rotor being equal to that of the circle so that the bi-rotor maintains continuous contact with both driving and driven members as its axis is rotated within a given range.

10. A continuously variable torque transmitter according to claim 5, wherein the driving and driven members are discs mounted for axial rotation.

11. A continuously variable torque transmitter according to claim 5, wherein the driving and driven members are discs fixed in position relative to each other, the discs being mounted for individual rotation about their axes, the axes of the discs and bi-rotor being in the same plane and the axes of the discs being parallel, the axis of the bi-rotor being perpendicular to the axes of the discs and the bi-rotor is mounted for movement only along its axis, the bi-rotor being in continuous frictional contact with both driving and driven discs within a particular range of its motion, and as it is moved within this range it approaches the center of one disc while approaching the perimeter of the other.

12. A continuously variable torque transmitter according to claim 5, wherein the driving and driven members are cylinders mounted for axial rotation.

13. A continuously variable torque transmitter according to claim 1, wherein the bi-rotor and cylinder are mounted so that they are free to rotate about their axes, and so that the axes can be rotated relative to one another about a line defined by the center point of the bi-rotor and the contact point of the bi-rotor and cylinder thus permitting the angle between the planes of rotation of the bi-rotor and cylinder to be varied without changing the position of the point of contact.

14. A continuously variable torque transmitter according to claim 12, wherein the cylinders are mounted for rotation about axes which are not coplanar and the bi-rotor is mounted for rotation about its axis on an axle which is mounted for rotation about a line defined by the points of frictional contact of the bi-rotor and the cylinders and the center of the bi-rotor.

* * * * *